(12) United States Patent
Nair et al.

(10) Patent No.: US 7,888,410 B2
(45) Date of Patent: Feb. 15, 2011

(54) METHOD OF MAKING POROUS PARTICLES

(75) Inventors: Mridula Nair, Penfield, NY (US);
Xiqiang Yang, Webster, NY (US);
Tamara K. Jones, Rochester, NY (US);
James G. Popowych, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 941 days.

(21) Appl. No.: 11/739,121

(22) Filed: Apr. 24, 2007

(65) Prior Publication Data

US 2008/0268367 A1    Oct. 30, 2008

(51) Int. Cl.
*C08J 3/07* (2006.01)

(52) U.S. Cl. .................. 523/339; 523/333; 430/137.1; 430/137.17

(58) Field of Classification Search ............. 430/137.1, 430/137.17; 523/333, 339
See application file for complete search history.

(56) References Cited

U.S. PATENT DOCUMENTS

| | | | |
|---|---|---|---|
| 3,923,704 A | 12/1975 | Gunning et al. |
| 3,979,342 A | 9/1976 | Baidins et al. |
| 4,254,201 A | 3/1981 | Sawai et al. |
| 4,339,237 A | 7/1982 | Wang et al. |
| 4,379,825 A | 4/1983 | Mitushashi |
| 4,461,849 A | 7/1984 | Karickhoff |
| 4,489,174 A | 12/1984 | Karickhoff |
| 4,899,060 A | 2/1990 | Lischke |
| 4,965,131 A | 10/1990 | Nair et al. |
| 7,041,420 B2 | 5/2006 | Vandewinckel et al. |
| 2002/0068233 A1 | 6/2002 | Ezenyilimba et al. |
| 2003/0054280 A1 | 3/2003 | Ishihara et al. |
| 2005/0026064 A1 | 2/2005 | Sugiura et al. |
| 2006/0263590 A1 | 11/2006 | Cheng et al. |
| 2007/0141501 A1 | 6/2007 | Jin et al. |
| 2008/0176157 A1 | 7/2008 | Nair et al. |
| 2008/0176164 A1 | 7/2008 | Nair et al. |
| 2008/0268363 A1 | 10/2008 | Nair et al. |

FOREIGN PATENT DOCUMENTS

| | | |
|---|---|---|
| EP | 0083188 | 7/1983 |
| EP | 1280011 | 1/2003 |
| JP | 3-26729 | 2/1991 |
| WO | WO 92/13027 | 8/1992 |

OTHER PUBLICATIONS

U.S. Appl. No. 11/870,710, filed Oct. 11, 2007, Massa et al.
U.S. Appl. No. 11/870,651, filed Oct. 11, 2007, Massa et al.

*Primary Examiner*—Mark F Huff
*Assistant Examiner*—Peter L Vajda
(74) *Attorney, Agent, or Firm*—Carl F. Ruoff; Andrew J. Anderson

(57) ABSTRACT

The present invention is a method for the preparation of porous particles that includes dissolving a polymer material in a first organic solvent and adding a second organic solvent and nonionic organic polymer particles to form an organic phase. The organic phase is dispersed in an aqueous phase that includes a particulate stabilizer to form a dispersion and the dispersion is homogenized. The first and second organic solvents are evaporated and the product is recovered.

10 Claims, 2 Drawing Sheets

METHOD OF MAKING POROUS PARTICLES

CROSS-REFERENCE TO RELATED APPLICATIONS

This application relates to commonly assigned US Publication No. 2008/0268363 (U.S. Ser. No. 11/739,118), filed simultaneously herewith and hereby incorporated by reference for all that it discloses.

FIELD OF THE INVENTION

This invention relates to a method of manufacturing novel particles having improved properties, and more particularly, to manufacturing toner particles having an elevated porosity.

BACKGROUND OF THE INVENTION

Conventional electrostatographic toner powders are made up of a binder polymer and other ingredients, such as pigment and a charge control agent, that are melt blended on a heated roll or in an extruder. The resulting solidified blend is then ground or pulverized to form a powder. Inherent in this conventional process are certain drawbacks. For example, the binder polymer must be brittle to facilitate grinding. Improved grinding can be achieved at lower molecular weight of the polymeric binder. However, low molecular weight binders have several disadvantages; they tend to form toner/developer flakes; they promote scumming of the carrier particles that are admixed with the toner powder for electrophotographic developer compositions; their low melt elasticity increases the off-set of toner to the hot fuser rollers of the electrophotographic copying apparatus, and the glass transition temperature (Tg) of the binder polymer is difficult to control. In addition, grinding of the polymer results in a wide particle size distribution. Consequently, the yield of useful toner is lower and manufacturing cost is higher. Also the toner fines accumulate in the developer station of the copying apparatus and adversely affect the developer life.

The preparation of toner polymer powders from a pre-formed polymer by the chemically prepared toner process such as the "Evaporative Limited Coalescence" (ELC) offers many advantages over the conventional grinding method of producing toner particles. In this process, polymer particles having a narrow size distribution are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060 and 4,965,131 to Nair et al., incorporated herein by reference for all that they contain.

This technique includes the following steps: mixing a polymer material, a solvent and optionally a colorant and a charge control agent to form an organic phase; dispersing the organic phase in an aqueous phase comprising a particulate stabilizer and homogenizing the mixture; evaporating the solvent and washing and drying the resultant product.

There is a need to reduce the amount of toner applied to a substrate in the Electrophotographic Process (EP). Porous toner particles in the electrophotographic process can potentially reduce the toner mass in the image area. Simplistically, a toner particle with 50% porosity should require only half as much mass to accomplish the same imaging results. Hence, toner particles having an elevated porosity will lower the cost per page and decrease the stack height of the print as well. The application of porous toners provides a practical approach to reduce the cost of the print and improve the print quality.

U.S. Pat. Nos. 3,923,704, 4,339,237, 4461,849, 4,489,174 and EP 0083188 discuss the preparation of multiple emulsions by mixing a first emulsion in a second aqueous phase to form polymer beads. These processes produce porous polymer particles having a large size distribution with little control over the porosity. This is not suitable for toner particles.

U.S. Publication No. 2005/0026064 describes a porous toner particle. However control of particle size distribution along with the even distribution of pores throughout the particle is a problem.

An object of the present invention is to provide a toner particle with increased porosity.

A further object of the present invention is to provide a toner particle with a narrow size distribution.

A still further object of the present invention is to provide a simple process that produces porous particles reproducibly and having a narrow size distribution.

SUMMARY OF THE INVENTION

The present invention is a method for the preparation of porous particles that includes dissolving a polymer material in a first organic solvent and adding a second organic solvent and nonionic organic polymer particles to form an organic phase. The organic phase is dispersed in an aqueous phase that includes a particulate stabilizer to form a dispersion and the dispersion is homogenized. The first and second organic solvents are evaporated and the product is recovered.

Figure 1:
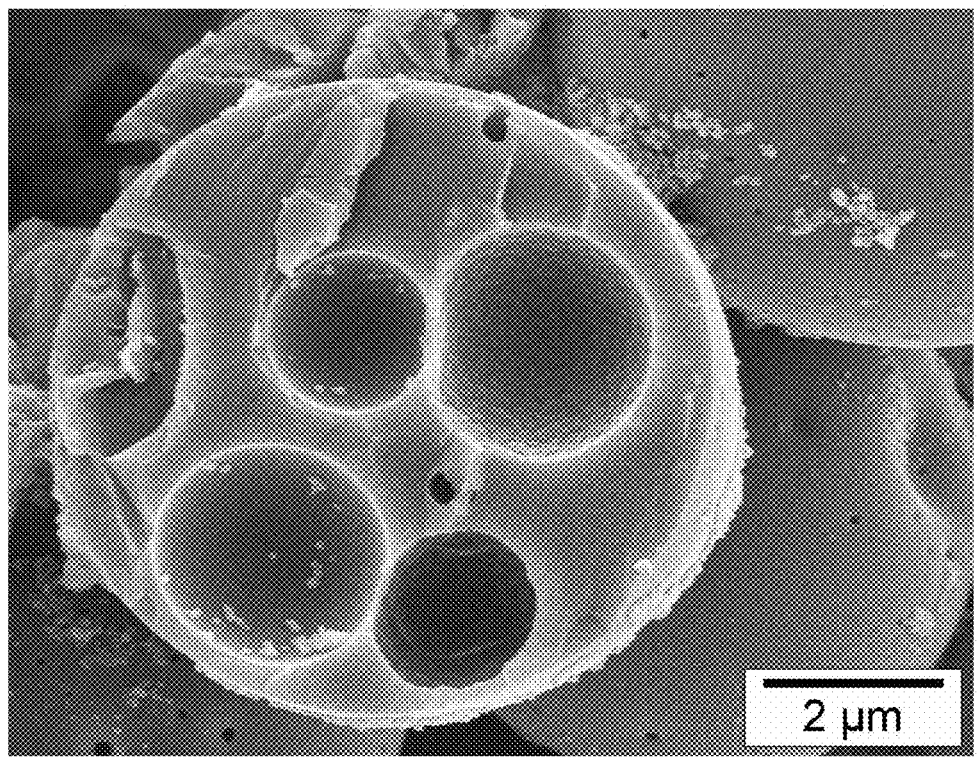
FIG. 1 is a Scanning Electron Micrograph (SEM) cross sectional image of a toner particle from Example 1 in accordance with the present invention.

For a better understanding of the present invention together with other advantages and capabilities thereof, reference is made to the following description and appended claims in connection with the preceding drawings.

DETAILED DESCRIPTION OF THE INVENTION

The use of porous toner particles in the electrophotographic process will reduce the toner mass in the image area.

For example, toner particles with 50% porosity should require only half as much mass to accomplish the same imaging results. Hence, toner particles having an elevated porosity will lower the cost per page and decrease the stack height of the print as well. The porous toner technology of the present invention provides a thinner image so as to improve the image quality, reduce curl, reduce image relief, save fusing energy and feel/look more close to offset printing rather than typical EP printing. In addition, colored porous particles of the present invention will narrow the cost gap between color and monochrome prints. Those potentials are expected to expand the EP process to broader application areas and promote more business opportunities for EP technology.

Porous polymer beads are used in various applications, such as chromatographic columns, ion exchange and adsorption resins, as drug delivery vehicles, scaffolds for tissue engineering, in cosmetic formulations, and in the paper and paint industries. The methods for generating pores inside polymer particles are known in the field of polymer science. However, due to the specific requirements for the toner binder materials, such as suitable glass transition temperatures, crosslinking density and rheology, and sensitivity to particle brittleness that comes from enhanced porosity, the preparation of porous toners is not straightforward. In the present invention, porous particles are prepared using a multiple emulsion process, in conjunction with a suspension process, particularly, the ELC process.

The porous particles of the present invention include "micro", "meso" and "macro" pores which according to the International Union of Pure and Applied Chemistry are the classification recommended for pores less than 2 nm, 2 to 50 nm, and greater than 50 nm respectively. The term porous particles will be used herein to include pores of all sizes, including open or closed pores and hollow particles.

The process for making the porous beads of this invention involves basically a modified ELC process. The first step involves the formation of a solution of a binder polymer dissolved in a first organic solvent, and nonionic organic polymer particles that serve as the pore stabilizer, dissolved in a second organic solvent such that the second organic solvent is a poor solvent for the binder polymer and may be miscible with the first organic solvent. Preferably, the first organic solvent is more volatile and more polar than the second organic solvent. The second step in the formation of the porous particles of this invention involves dispersing the above mentioned solution into an aqueous phase of colloidal organic or inorganic particles such as silica e.g., Ludox™, in an ELC process described in U.S. Pat. Nos. 4,883,060; 4,965,131; 2,934,530; 3,615,972; 2,932,629 and 4,314,932, the disclosures of which are hereby incorporated by reference.

Specifically, in the second step of the process of the present invention, an aqueous suspension of organic phase droplets is formed that is subjected to shear to reduce droplet size and achieve narrow size distribution droplets through the limited coalescence process. The pH of the aqueous phase is generally between 4 and 7 when using silica as the colloidal stabilizer.

Any type of mixing and shearing equipment may be used to perform the practice of this invention, such as a batch mixer, planetary mixer, single or multiple screw extruder, dynamic or static mixer, colloid mill, high pressure homogenizer, sonicator, or a combination thereof. While any high shear type agitation device is applicable to this step of the present invention, a preferred homogenizing device is the MICROFLUIDIZER such as Model No. 110T produced by Microfluidics Manufacturing. In this device, the droplets of the organic phase are dispersed and reduced in size in the aqueous phase in a high shear agitation zone and, upon exiting this zone, the particle size of the dispersed organic phase is reduced to uniform sized very fine dispersed droplets in the aqueous phase after which the very fine droplets coalesce in a limited manner to give larger droplets of a uniform size stabilized by colloidal silica particles. The temperature of the process can be modified to achieve the optimum viscosity for emulsification of the droplets. The temperature of the process can be modified to achieve the optimum viscosity for emulsification of the droplets.

The next step in the preparation of the porous particles of this invention involves removal of the organic solvents that are used to dissolve the binder polymer and the nonionic organic polymer particles so as to produce a suspension of uniform porous polymer particles. The porosity occurs as the first organic solvent volatilizes and enriches the organic phase with the second organic solvent, which, by virtue of being a poor solvent for the polymer binder, phase separates into domains of the second organic solvent containing the dissolved nonionic organic polymer particles. Upon removal of the second solvent and desolvation of the nonionic organic polymer particles, pores are left behind to create a porous particle. While the porosity is usually manifested as discrete domains, it may also create a hollow particle depending on the conditions used. The porous polymer particles are next isolated followed by drying under vacuum and/or in an oven. Optionally, the particles are treated with alkali to remove the silica stabilizer.

Optionally, the third step in the preparation of porous particles described above may be preceded by the addition of an organic, water miscible non-solvent for the binder polymer, prior to removal of the organic solvents and drying.

In the practice of this invention, the nonionic organic polymer particles are intended as suitable pore stabilizing material and include organic polymer particles that can be dissolved in an organic solvent that is a poor solvent for the binder polymer. The nonionic polymer particles as described here are internally crosslinked polymers or macromolecules, or crosslinked latex particles that form stable solutions in non-aqueous solvents particularly non-polar hydrocarbon solvents to form stable solutions. A stable solution is defined as the ability of the non-polar solvent to dissolve the nonionic organic polymer particles at a loading of at least 15 weight percent nonionic polymer particles without phase separation. Examples of such particles are described in U.S. Pat. No. 4,758,492 the disclosures of which are hereby incorporated by reference. The essential properties of the pore stabilizing nonionic organic polymer particles are solubility in the desired organic solvents, particularly low dielectric non-polar solvents, no negative impact on ELC process, and no or little negative impact on fusing and melt rheology of the resulting particles when they are used as electrostatographic toners. The amount of the nonionic organic polymer particles used for stabilizing the pores depends on the amount of porosity and size of pores desired and the amount of the second solvent used relative to the binder polymer. A preferred nonionic organic polymer particle is poly(isobutyl methacrylate-co-2-ethylhexyl methacrylate-co-divinylbenzene) having a weakly acidic surface and an average diameter less than one micrometer. Another useful nonionic organic polymer particle is poly(isobutyl methacrylate-co-4-tert-butylstryrene-co-divinylbenzene). Similarly prepared nonionic organic polymer particles useful in the present invention can be found in U.S. Pat. No. 4,758,492, which is hereby incorporated by reference in its entirety. These nonionic organic polymer particles are generally used in an amount of from 0.5-20 weight percent of the binder polymer, preferably in an amount of from 1-15 weight percent of the binder polymer.

Optionally, in addition to the nonionic organic polymer particles, lipophilic emulsifying agents may be employed in the practice of this invention to enhance the discrete domains leading to pores. Emulsifying agents are surface-active compounds that can lower interfacial free energy and stabilize the phase separated domains leading to pores in the toner. Useful emulsifying agents have to remain in the dispersed organic phase and be present at the interface between the binder polymer solution and the second solvent containing the nonionic organic polymer particles to enable discrete pore formation. Thus, highly lipophilic emulsifiers are desired. Typical lipophilic emulsifying agents that are useful in the present invention are those with an HLB value of lower than 5.0, preferably 4.5 or lower. HLB values are the so-called hydrophilic-lipophilic balance values that are widely accepted as a measure of the degree to which the emulsifying agent is hydrophilic or lipophilic (Griffin, W C, *Journal of the Society of Cosmetic Chemists*, 5 (1954): 259.). Lower HLB numbers indicate lipophilic compounds while higher number represent more hydrophilic surfactants.

Two or more appropriate emulsifiers may be mixed so long as the desired HLB values are retained, as is normally practiced in the art. In the present invention, lipophilic emulsifying agents may be added in the organic phase in the ELC process in the amount of about 0.01% to about 1.0% by weight of the binder polymer solids. Examples of emulsifiers useful in the present invention are SPA™ 65 (HLB=2.1), SPAN™ 60 (HLB=4.7), and SPAN™ 80 (HLB=4.3).

Alternatively, polymeric materials often used as compatibilizing agents such as block and graft copolymers may be used in the practice of the present invention to assist in stabilizing the discrete domain formation leading to the pores. Examples of such polymers are the Tuftecs™ made by Asaji Kasei Corporation, Japan. These include the Tuftec™ P series (styrene/(butadiene/butylene)), and the H and M (poly styrene/(ethylene/butylene)) series. Other polymers include the Kraton D and G series from Kraton.

As indicated above, the present invention is applicable to the preparation of polymeric particles from any type of binder polymer or binder resin that is capable of being dissolved in a solvent that is immiscible with water wherein the binder itself is substantially insoluble in water. Useful binder polymers include polymers and copolymers derived from vinyl monomers and condensation polymers and mixtures thereof. As the binder polymer, known binder resins are useable. Concretely, these binder resins include homopolymers and copolymers such as polyesters; polymers of styrenes (e.g. styrene and chlorostyrene), monoolefins (e.g. ethylene, propylene, butylene and isoprene), vinyl esters (e.g. vinyl acetate, vinyl propionate, vinyl benzoate and vinyl butyrate), methylene aliphatic monocarboxylic acid esters (e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate), vinyl ethers (e.g. vinyl methyl ether, vinyl ethyl ether and vinyl butyl ether), and vinyl ketones (e.g. vinyl methyl ketone, vinyl hexyl ketone and vinyl isopropenyl ketone). Particularly desirable binder polymers/resins include polyesters, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. Also, especially useful are polyesters of aromatic or aliphatic dicarboxylic acids with one or more aliphatic diols, such as polyesters of isophthalic or terephthalic or fumaric acid with diols such as ethylene glycol, cyclohexane dimethanol and bisphenol adducts of ethylene or propylene oxides.

Preferably the acid values (expressed as milligrams of potassium hydroxide per gram of resin) of the binder resins are in the range of 2-100. Of these resins, styrene/acryl and polyester resins are particularly preferable. The polyester resins may be saturated or unsaturated.

In the practice of this invention, it is particularly advantageous to utilize resins having a viscosity in the range of 1 to 100 centipoise when measured as a 20 weight percent solution in ethyl acetate at 25° C.

Any suitable solvent that will dissolve the binder polymer and which is also immiscible with water may be used in the practice of this invention such as for example, chloromethane, dichloromethane, methyl acetate, ethyl acetate, propyl acetate, vinyl chloride, 2-butanone, trichloromethane, carbon tetrachloride, ethylene chloride, trichloroethane, toluene, xylene, cyclohexanone, 2-nitropropane and the like. Particularly useful solvents in the practice of this invention are methyl acetate, ethyl acetate, and propyl acetate for the reason that they are both good solvents for many polymers and at the same time sparingly soluble in water. Further, their volatility is such that they are readily removed from the organic phase droplets, by evaporation, preferably under reduced pressure to yield the toner particles.

Optionally, the solvent that will dissolve the binder polymer and which is immiscible with water may be a mixture of two or more water-immiscible solvents chosen from the list given above.

The second organic solvent is chosen such that it is a poor solvent for the binder polymer and is preferably less volatile than the first organic solvent. Suitable second organic solvents for the practice of this invention include one or more substantially non-polar solvents. Organic solvents such as substituted or unsubstituted saturated linear or branched hydrocarbons of the general formula $C_nH_{2n+2}$ where n can be between 6-20, aromatic hydrocarbons, and halogenated organic solvents are a few suitable types of solvents which may comprise a single solvent or a blend of more than one solvent in order to tune its physical properties. Useful hydrocarbons include, but are not limited to, hexane, heptane, octane, decane, dodecane, tetradecane, xylene, toluene, naphthalene, cyclohexane, benzene, the aliphatic hydrocarbons in the ISOPAR series (Exxon), NORPAR (a series of normal paraffinic liquids from Exxon), SHELL-SOL (Shell), and SOL-TROL (Shell), naphtha, STENCIL CLEAN (Qtek) and other petroleum solvents such as superior kerosene, paraffinic liquids, white mineral oil, or suitable mixtures thereof.

Removal of the second solvent is necessary for generation of pores inside the toner particle. As stated above, the second solvent is preferably less volatile than the first organic solvent. After evaporation of the first solvent, several methods can be used effectively to separate the second solvent from the toner particle. These include further evaporation under reduced pressure, freeze drying, extraction and evaporation by the use of a co-solvent in a second evaporation step, and use of supercritical fluids (SCF) in a treatment of the emulsion, such as purging the emulsion with the SCF. Useful co-solvents in the present invention include low boiling, water miscible organic solvents such as methanol, ethanol, acetonitrile, n-propanol, isopropanol, and mixtures thereof. A particularly useful SCF is supercritical carbon dioxide.

Various additives generally present in electrostatograhic toner may be added to the binder polymer prior to dissolution in the solvent or in the dissolution step itself, such as colorants, charge control agents, and release agents such as waxes and lubricants.

Colorants, a pigment or dye, suitable for use in the practice of the present invention are disclosed, for example, in U.S. Reissue Pat. No. 31,072 and in U.S. Pat. Nos. 4,160,644; 4,416,965; 4,414,152 and 2,229,513. As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. Colorants can generally be employed in the range of from about 1 to about 90 weight percent on a total toner powder weight basis, and preferably in the range of about 2 to about 20 weight percent, and most preferably from 4 to 15 weight percent in the practice of this invention. When the colorant content is 4% or more by weight, a sufficient coloring power can be obtained, and when it is 15% or less by weight, good transparency can be obtained. Mixtures of colorants can also be used. Colorants in any form such as dry powder, its aqueous or oil dispersions or wet cake can be used in the present invention. Colorant milled by any methods like media-mill or ball-mill can be used as well.

The release agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 10% by mass, and preferably 0.5 to 7% by mass, based on the toner.

The wax may be incorporated into the toner through several ways. The wax may be first dispersed in the binder by melt compounding and then introduced into the organic phase. It may also be separately processed into a dispersion form in an organic solvent, with appropriate dispersing aids. In one embodiment, the wax exists in the final toner as fine solid particles.

The term "charge control" refers to a propensity of a toner addendum to modify the triboelectric charging properties of the resulting toner. A very wide variety of charge control agents for positive charging toners are available. A large, but lesser number of charge control agents for negative charging toners, is also available. Suitable charge control agents are disclosed, for example, in U.S. Pat. Nos. 3,893,935; 4,079,014; 4,323,634; 4,394,430 and British Patents 1,501,065; and 1,420,839. Charge control agents are generally employed in small quantities such as, from about 0.1 to about 5 weight percent based upon the weight of the toner. Additional charge control useful agents are described in U.S. Pat. Nos. 4,624,907; 4,814,250; 4,840,864; 4,834,920; 4,683,188 and 4,780,553. Mixtures of charge control agents can also be used.

The average particle diameter of the porous toner of the present invention is, for example, 2 to 50 micrometers, preferably 3 to 20 micrometers.

The porosity of the particles is greater than 10%, preferably between 20 and 90% and most preferably between 30 and 70%.

Alternatively, in the practice of the present invention, the nonionic organic polymer particle solution may be mixed with a mixture of water-immiscible polymerizable monomers, a polymerization initiator and optionally a colorant, a release agent, and a charge control agent, and emulsified with an aqueous phase comprising solid stabilizer particles to form a limited coalescence (LC) emulsion. The monomers in the emulsified mixture are polymerized, preferably through the application of heat or radiation. The solvent used for dissolving the non-ionic organic polymer particles may then be removed as described earlier and the resulting suspension polymerized particles may be isolated and dried to yield porous particles.

Useful monomers for this LC polymerization process include vinyl monomers, such as styrene; vinyl esters, e.g. vinyl acetate, vinyl propionate, vinyl benzoate and vinyl butyrate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone; and mixtures thereof. Particularly desirable monomers include styrene, mixtures of styrene/alkyl acrylate, styrene/alkyl methacrylate, styrene/acrylonitrile, styrene/maleic anhydride. Styrene/acryl mixtures are particularly preferable.

The shape of the toner particles has a bearing on the electrostatic toner transfer and cleaning properties. Thus, for example, the transfer and cleaning efficiency of toner particles have been found to improve as the sphericity of the particles are reduced. A number of procedures to control the shape of toner particles are known in the art. In the practice of this invention, additives may be employed in the water phase or in the solvent used to dissolve the polymer binder if necessary. The additives may be added after or prior to forming the LC process. In either case the interfacial tension is modified as the solvent is removed resulting in a reduction in sphericity of the particles. U.S. Pat. No. 5,283,151 describes the use of carnauba wax to achieve a reduction in sphericity of the particles. U.S. Ser. No. 11/611,208 filed Dec. 15, 2006 entitled "Toner Particles of Controlled Surface Morphology and Method of Preparation" describes the use of certain metal carbamates that are useful to control sphericity and U.S. Ser. No. 11/621,226 filed Dec. 15, 2006 entitled "Chemically Prepared Toner Particles with Controlled Shape" describes the use of specific salts to control sphericity. U.S. Ser. No. 11/472,779 filed Jun. 22, 2006 entitled "Toner Particles of Controlled Morphology" describes the use of quaternary ammonium tetraphenylborate salts to control sphericity. These applications are incorporated by reference herein.

Toner particles of the present invention may also contain flow aids in the form of surface treatments. Surface treatments are typically in the form of inorganic oxides or polymeric powders with typical particle sizes of 5 nm to 1000 nm. With respect to the surface treatment agent also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the spacing agent are from about 0.05 to about 10 weight percent, and most preferably from about 0.1 to about 5 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, uniform mixing is preferred and achieved by such mixers as a high energy Henschel-type mixer which is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention.

The preferred spacing agent is silica, such as those commercially available from Degussa, like R-972, or from Wacker, like H2000. Other suitable spacing agents include, but are not limited to, other inorganic oxide particles, polymer particles and the like. Specific examples include, but are not limited to, titania, alumina, zirconia, and other metal oxides; and also polymer particles preferably less than 1 μm in diameter (more preferably about 0.1 μm), such as acrylic polymers, silicone-based polymers, styrenic polymers, fluoropolymers, copolymers thereof, and mixtures thereof.

The invention will further be illustrated by the following examples. They are not intended to be exhaustive of all possible variations of the invention.

The Kao Binder E, a polyester resin, used in the examples below was obtained from Kao Specialties Americas LLC, a part of Kao Corporation, Japan. The blue pigment used in the Examples of this invention came from Blue Lupreton SE 1163 from BASF, which consisted of Pigment Blue 15:3 as a flushed pigment 40% loading dispersed in a linear copolymer of fumaric acid and bisphenol A. The nonionic organic polymer particles used in the following examples were M1, poly (isobutyl methacrylate-co-2-ethylhexyl methacrylate-co-divinylbenzene in a weight ratio of 62/35/3) and M2, poly (isobutylmethacrylate-co-4-tertbutylstyrene-co-divinylbenzene) in a weight ratio of 72/26/2. Both M1 and M2 were made using emulsion polymerization reaction as described in U.S. Pat. No. 4,758,492. The promoter described in the Examples was a condensation polymer of methyl amino ethanol and adipic acid. Hexane used as a solvent in some of the experiments was a mixtures of isomers and was obtained from OmniSolv, EMD Chemicals Inc. Gibbstown, N.J. 08027. Nalco™1060 and Nalco™2329, both colloidal silicas, were obtained from Nalco Chemical Company as 50 and 40 weight percent dispersions respectively.

The particle size was measured using either a Coulter Particle Analyser or a Sysmex FPIA-3000, an image based automated particle shape and size analyzer from Malvern Instruments. The volume and number median values from the Coulter measurements were used to assess the particle size distribution and the volume median value was used to represent the particle size of the particles described in these examples.

The extent of porosity of the particle of the present invention was visualized using a range of microscopy techniques. Conventional Scanning Electron Microscope (SEM) imaging was used to image fractured samples and view the inner pore structure.

The porous polymer particles of this invention were made using the following general procedure:

EXAMPLE 1

Preparation of Porous Particles Using Nonionic Organic Polymer Particles M1

An organic phase was prepared using 96.2 g of a 20 weight percent solution of Kao E binder and 0.18 g M1 dissolved in 3.6 g of heptane. This organic phase was mixed with an aqueous mixture prepared with 139 g of pH4 citrate buffer containing 1 g of Nalco™ 2329 and 2.2 g of a 10 weight percent promoter solution and then subjected to very high shear using a Silverson L4R Mixer (sold by Silverson Machines, Inc.) followed by homogenization in a Microfluidizer Model #110T from Microfluidics. The organic solvents were removed under reduced pressure with a rotary evaporator. The resultant particles had an average size of 7.5 micrometers. FIG. 1 is an SEM cross-section of a particle from Example 1 and shows the pores in the particle.

EXAMPLE 2

Preparation of Porous Particles Containing Pigment Using Nonionic Organic Polymer Particles M1

Figure 2:
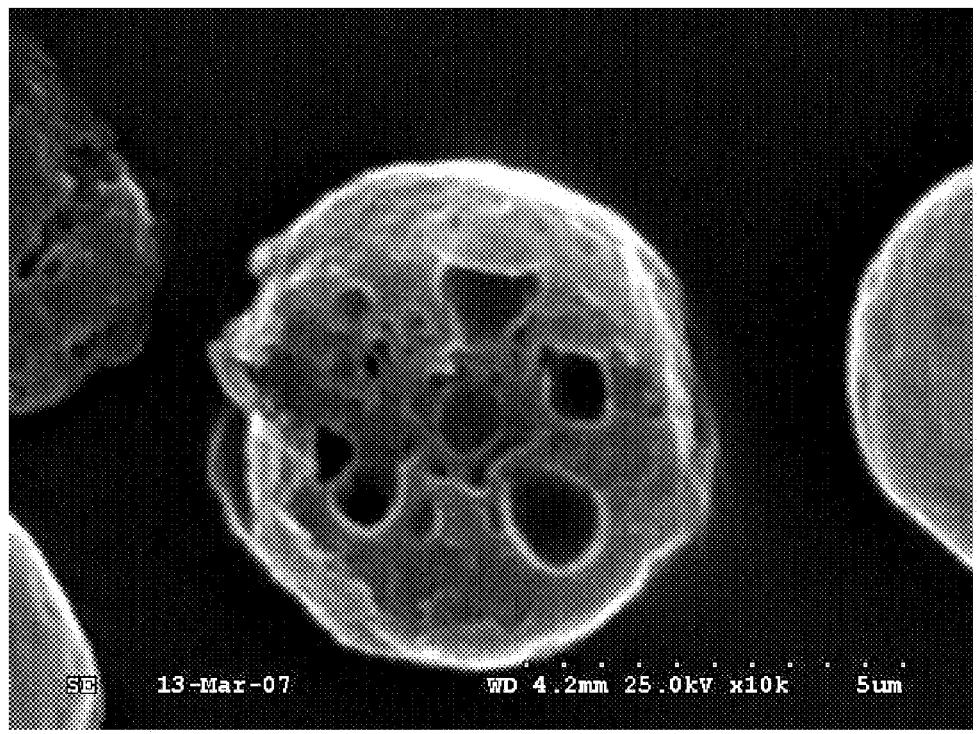
FIG. 2 is a Scanning Electron Micrograph (SEM) cross sectional image of a toner particle from Example 2 in accordance with the present invention.

An organic phase was prepared which was comprised of 12.71 g of Kao Binder E, 1.688 g of BASF Lupreton Blue SE 1163, 50.0 g of methyl acetate, 0.60 g of nonionic organic polymer particles M1, and 10.0 g of hexane. This organic phase was mixed with an aqueous mixture containing 103.76 g of water, 0.689 g of potassium hydrogen phthalate, 6.60 g of Nalco™ 1060, and 1.452 g of 10% promoter. This mixture was then subjected to very high shear as described in Example 1. The ethyl acetate was removed under reduced pressure with a rotary evaporator. The resulting toner particles containing residual hexanes in the mainly aqueous mixture were then mixed with an equal volume of 3A alcohol (95:5 ethanol:methanol), and the dispersion was again subject to rotary evaporation under reduced pressure. After removal of about 50% of the alcohol added, the resulting suspension was filtered and the toner particles were washed with deionized water, and then dried in a vacuum oven at about 32° C. for about 20 hours. The resultant particles had a volume median size of 6.1 micrometers and a number median size of 5.6 micrometers. The toner was freeze fractured and examined under a Scanning Electron Microscope. The particles were porous as shown in FIG. 2 and the size distribution was narrow as shown by the volume and number median diameters.

EXAMPLE 3

Comparative

An organic phase was prepared which was comprised of 12.71 g of Kao Binder E, 1.688 g of BASF Lupreton Blue SE 1163, 60.0 g of ethyl acetate, and 0.60 g of nonionic organic polymer particles M1. The aqueous phase was the same as that for Example 2. The organic phase was dispersed in the aqueous phase and the solvent removed as in example 1. The resulting 5.9 micron toner upon analysis with an optical microscope and showed no pores. This result shows that the second hydrocarbon solvent in conjunction with the nonionic organic polymer particles is necessary for pore generation.

EXAMPLE 4

An organic phase was prepared which was comprised of 12.68 g of Kao Binder E, 1.688 g of BASF Lupreton Blue SE 1163, 30.0 g of methyl acetate. A second organic phase was prepared using 15.0 g of hexane, 15.0 g of methyl acetate, 0.030 g of SPAN™ 65 (from Fluka), and 0.60 g of nonionic organic polymer particles M1. The two organic phases were combined and then mixed in with an aqueous phase which was the same as that for Example 3. After homogenizing as in Example 1, the dispersion was treated with a mixture of 200 g of water and 200 g of 3A alcohol. The organic solvents were then removed under reduced pressure on a rotary evaporator. The solid toner particles were collected by filtration through a sintered glass filter and washed with water. The resulting 5.9 micron toner was analyzed with a photomicroscope and showed pores.

EXAMPLE 5

Figure 3:
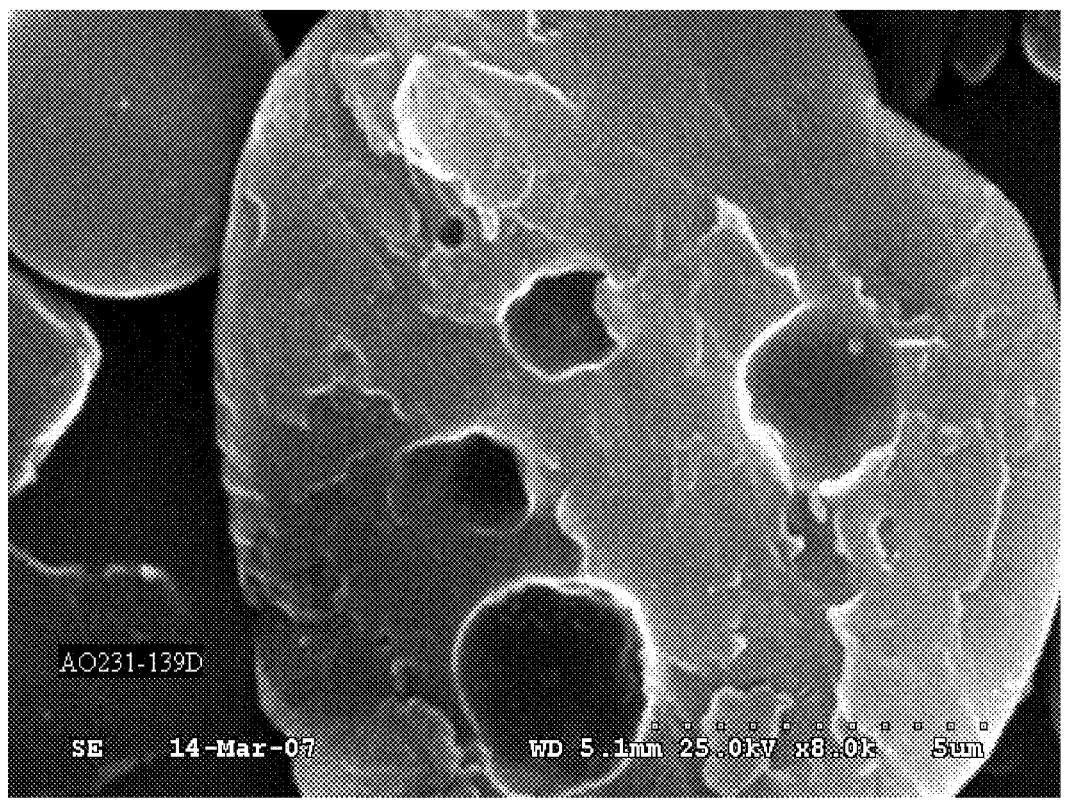
FIG. 3 is a Scanning Electron Micrograph (SEM) cross sectional image of a toner particle from Example 5 in accordance with the present invention.

An organic phase was prepared which was comprised of 15.75 g of Kao Binder E, 2.25 g of BASF Lupreton Blue SE 1163, 70.0 g of ethyl acetate, 10.0 g of hexane, and 2.00 g of nonionic organic polymer particles M2. The organic phase was mixed in with an aqueous phase prepared with 138.35 g of water, 0.918 g of potassium hydrogen phthalate (KHP), 8.80 g of Nalco 1060 and 1.936 g of 10% promoter. The mixture was subject to high shear as in Example 1. Upon exiting the microfluidizer the mixture was added to a 50% aqueous solution of 3A Alcohol and subject to rotary evaporation under reduced pressure. After removal of about 50% of the alcohol added, the resulting suspension was filtered and the toner particles washed with deionized water, and then dried in a vacuum oven at 32° C. for about 20 hours. The resultant particles had an average size of 7.2 micrometers. The toner is shown to have pores as is evident from FIG. 3, which is an SEM image of a fractured toner particle.

The invention has been described in detail with particular reference to certain preferred embodiments thereof, but it will be understood that variations and modifications can be effected within the spirit and scope of the invention.

The invention claimed is:

1. A method for the preparation of porous particles comprising the steps of:
   a) dissolving a polymer material in a first organic solvent and adding a second organic solvent and nonionic organic polymer particles to form an organic phase, where the second organic solvent is a poor solvent for the binder polymer and is less volatile than the first organic solvent;
   b) dispersing the organic phase in an aqueous phase comprising a particulate stabilizer to form a dispersion and homogenizing the dispersion;
   c) evaporating the first and second organic solvents and recovering a product comprising porous particles, wherein pores in the porous particles are stabilized by the nonionic organic polymer particles.

2. The method of claim 1 further comprising:
   d) washing and drying the product.

3. The method of claim 1 further comprising:
   adding an organic, water miscible solvent that does not dissolve the polymer prior to step c).

4. The method of claim 1 wherein the first organic solvent is selected from the group consisting of chloromethane, dichloromethane, methyl acetate, ethyl acetate, propyl acetate, vinyl chloride, 2-butanone, trichloromethane, carbon tetrachloride, ethylene chloride, trichloroethane, toluene, xylene, cyclohexanone and 2-nitropropane.

5. The method of claim 1 wherein the nonionic organic polymer particles form stable solution in the second organic solvent.

6. The method of claim 1 wherein the second organic solvent is selected from the group consisting of substituted or unsubstituted saturated linear or branched hydrocarbons of the general formula $C_nH_{2n+2}$ where n can be between 6-20, aromatic hydrocarbons, halogenated organic solvents and mixtures thereof.

7. The method of claim 1 wherein the aqueous phase comprises a pH of from 4 to 7.

8. The method of claim 1 wherein the nonionic organic polymer particles comprise internally crosslinked macromolecule or crosslinked latex particles.

9. The method of claim 1 wherein the nonionic organic polymer particles are selected from the group consisting of binder polymer is selected from the group consisting of polyesters; polymers of styrenes, monoolefins, vinyl esters, methylene aliphatic monocarboxylic acid esters, vinyl ethers and vinyl ketones.

10. The method of claim 1 wherein the aqueous phase comprises silica as the particulate stabilizer and has a pH of from 4 to 7.

* * * * *